(12) United States Patent
Peng et al.

(10) Patent No.: US 12,223,757 B2
(45) Date of Patent: Feb. 11, 2025

(54) IMAGE PROCESSING METHOD, DEVICE, ELECTRONIC APPARATUS, AND STORAGE MEDIUM

(71) Applicant: Zhuhai Pantum Electronics Co., Ltd., Zhuhai (CN)

(72) Inventors: Jibing Peng, Zhuhai (CN); Yangxiao Ma, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 339 days.

(21) Appl. No.: 17/846,364

(22) Filed: Jun. 22, 2022

(65) Prior Publication Data
US 2022/0319215 A1    Oct. 6, 2022

Related U.S. Application Data

(63) Continuation of application No. PCT/CN2020/131533, filed on Nov. 25, 2020.

(30) Foreign Application Priority Data

Dec. 24, 2019 (CN) .......................... 201911348198.1

(51) Int. Cl.
*G06V 30/413* (2022.01)
*G06V 10/82* (2022.01)
(Continued)

(52) U.S. Cl.
CPC ............ *G06V 30/413* (2022.01); *G06V 10/82* (2022.01); *G06V 30/18* (2022.01);
(Continued)

(58) Field of Classification Search
CPC ........... G06V 30/413; G06V 30/18105; G06V 30/18; G06V 10/82; H04N 1/448; H04N 1/60
See application file for complete search history.

(56) References Cited

U.S. PATENT DOCUMENTS 10,417,342 B1    9/2019 Yang et al.
2003/0133607 A1*  7/2003 Goto .................... H04N 1/6072
                                                             382/162
(Continued)

FOREIGN PATENT DOCUMENTS

CN    101197914 A    6/2008
CN    108153468 A    6/2018
(Continued)

OTHER PUBLICATIONS

The World Intellectual Property Organization (WIPO) International Search Report for PCT/CN2020/131533 Mar. 3, 2021 6 Pages (including translation).

*Primary Examiner* — David F Dunphy
(74) *Attorney, Agent, or Firm* — ANOVA LAW GROUP, PLLC (57) ABSTRACT

An image processing method, applied to an electronic apparatus, includes performing feature extraction processing on a source image to obtain a feature data set corresponding to a source file, determining an image processing parameter corresponding to the feature data set according to the feature data set, and processing the source image according to the image processing parameter.

18 Claims, 3 Drawing Sheets

(51) Int. Cl.
*G06V 30/18* (2022.01)
*H04N 1/44* (2006.01)
*H04N 1/60* (2006.01)

(52) U.S. Cl.
CPC ....... *G06V 30/18105* (2022.01); *H04N 1/448* (2013.01); *H04N 1/60* (2013.01)

(56) References Cited

U.S. PATENT DOCUMENTS

| | | | | |
|---|---|---|---|---|
| 2012/0159296 A1* | 6/2012 | Rebstock | ............. | G06V 30/413 |
| | | | | 715/205 |
| 2017/0286803 A1 | 10/2017 | Singh et al. | | |
| 2020/0302165 A1* | 9/2020 | Dang | ..................... | G06N 20/00 |

FOREIGN PATENT DOCUMENTS

| | | | |
|---|---|---|---|
| CN | 108364267 A | 8/2018 |
| CN | 108764370 A | 11/2018 |
| CN | 108885699 A | 11/2018 |
| CN | 109191389 A | 1/2019 |
| CN | 109872284 A | 6/2019 |
| CN | 111126273 A | 5/2020 |
| WO | 2019114418 A1 | 6/2019 |

* cited by examiner

IMAGE PROCESSING METHOD, DEVICE, ELECTRONIC APPARATUS, AND STORAGE MEDIUM

CROSS-REFERENCE TO RELATED APPLICATIONS

This application is a continuation of International Application No. PCT/CN2020/131533, filed Nov. 25, 2020, which claims priority to Chinese Application No. 201911348198.1, filed Dec. 24, 2019, the entire content of all of which are incorporated herein by reference.

TECHNICAL FIELD

The present disclosure generally relates to the image processing technology field and, more particularly, to an image processing method, device, electronic apparatus, and storage medium.

BACKGROUND

Nowadays, a user often needs to manually set a processing parameter of an image processing device when using the image processing device such as a printer, a copy machine, a scanner, etc. However, the image processing device has a variety of functional settings, and a variety of types of source files need to be processed. When the user sets the image processing parameters of the image processing device, an operation is complicated and cumbersome, and a degree of intelligence is low. Thus, user experience is reduced.

SUMMARY

Embodiments of the present disclosure provide an image processing method, a device, an electronic apparatus, and a storage medium, which are used to solve a problem in the existing technology that an operation is complex and cumbersome when a user sets an image processing parameter of an image processing device, and a degree of intelligence is low.

Embodiments of the present disclosure provide an image processing method applied to an electronic apparatus. The method includes performing feature extraction processing on a source image to obtain a feature data set corresponding to a source file, determining an image processing parameter corresponding to the feature data set according to the feature data set, and processing the source image according to the image processing parameter.

Embodiments of the present disclosure provide an electronic apparatus, including a processor and a memory. The memory stores program instructions. The processor is coupled with the memory and, when the program instructions are executed, configured to perform feature extraction processing on a source image to obtain a feature data set corresponding to a source file, determine an image processing parameter corresponding to the feature data set according to the feature data set, and process the source image according to the image processing parameter.

Embodiments of the present disclosure provide a non-transitory computer-readable storage medium. The non-transitory computer-readable storage medium stores a program that, when executed by a processor, causes the processor to perform feature extraction processing on a source image to obtain a feature data set corresponding to a source file, determine an image processing parameter corresponding to the feature data set according to the feature data set, and process the source image according to the image processing parameter.

In the present disclosure, the image processing device may be configured to perform the feature extraction processing on the source image, identify the feature data set by using the trained neural network, and finally generate the image processing parameter corresponding to the source image. Therefore, the image processing parameter of the source image may not need to be set manually, and the image processing may be performed intelligently. In embodiments of the present disclosure, the file type may be intelligently identified through the image processing parameter determination module. The image processing parameters for different types of source files may be automatically generated. Thus, the image processing parameters may be automatically set, which simplifies the cumbersome operation of the user and improves the file copying and output quality. By extracting the tone information and color gamut information of the source file and considering the user habits, the color processing may be performed in a customized manner to ensure the quality of the color restoration. By automatically identifying the sensitive character of the source file and hiding the sensitive character, the security of the confidential level file may be enhanced.

DETAILED DESCRIPTION OF THE EMBODIMENTS

In order to better understand the technical solutions of the present disclosure, embodiments of the present disclosure are described in detail below in connection with the accompanying drawings.

Embodiments of the present disclosure provide an image processing device. The image processing device may print, for example, print data generated by a computer on a recording medium such as printing paper. The image processing device may include, but is not limited to, copiers, for example, a copy machine, a printer, a fax machine, a scanner, and a multifunction external device that performs functions thereof in a single apparatus. The image processing device of embodiments of the present disclosure may be configured to, for example, perform printing processing on a digital file output by a terminal apparatus, and perform copying processing or scanning processing on a paper file.

Figure 1:
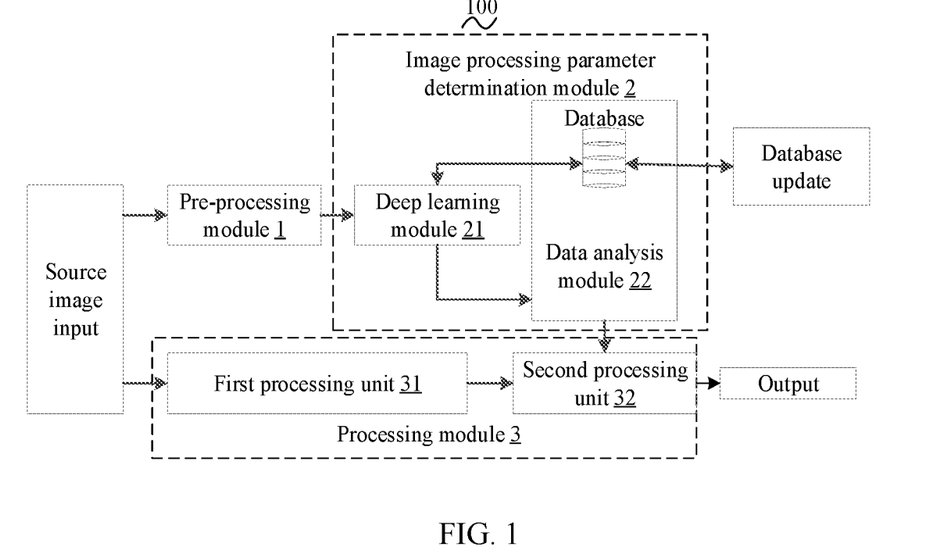
FIG. 1 is a schematic structural diagram of an image processing device according to some embodiments of the present disclosure.

FIG. 1 is a schematic structural diagram of an image processing device according to some embodiments of the present disclosure.

As shown in FIG. 1, the image processing device 100 includes a pre-processing module 1, an image processing parameter determination module 2, and a processing module 3. The image processing parameter determination module 2 includes a deep learning module 21 and a data analysis module 22. A main design idea of embodiments of the present disclosure may include performing feature extraction on a source image corresponding to a source file that needs to be processed through the pre-processing module 1 to form a feature data set. The feature data set may include but is not limited to at least one of image element information, layout information, boundary contour information, tone information, or color gamut information. Then, the main design idea of embodiments of the present disclosure may further include sending the feature data set to the deep learning module 21 by the pre-processing module 1 and performing identification on the feature data set according to a pre-trained neural network by the deep learning module 21 to obtain identification information corresponding to the feature data set. The identification information may include but is not limited to at least one of file type information, sensitive character identification information, a CMYK tone adjustment value, a tone curve adjustment value, a brightness adjustment value, or a color adjustment value. Then, the main design idea of embodiments of the present disclosure may further include sending the identification information to the data analysis module 22 by the deep learning module 21, retrieving an image processing parameter corresponding to the identification information from a database of the data analysis module 22 after obtaining the identification information by the data analysis module 22, sending the image processing parameter to the processing module 3 by the data analysis module 22, and performing processing on the source image according to the image processing parameter. Thus, the image processing parameter may be automatically set, and the image processing may be performed intelligently.

Through the pre-processing module 1, deep learning module 21, data analysis module 22, and processing module 3, parameter setting and adjustment may be automatically performed on the source image corresponding to the source file that is to be processed without manually setting the parameter. Thus, the image may be processed automatically. In embodiments of the present disclosure, at least one of the pre-processing module 1, the deep learning module 21, the data analysis module 22, and the processing module 3 may be implemented in hardware or in software. In some other embodiments, at least one of the pre-processing module 1, the deep learning module 21, the data analysis module 22, and the processing module 3 may be partially implemented in hardware and partially implemented in software, which is not limited by embodiments of the present disclosure.

Modules of the image processing device 100 are described in more detail below.

The pre-processing module 1 may be configured to perform the feature extraction processing on the source image to obtain the feature data set corresponding to the source image.

In some embodiments of the present disclosure, the pre-processing module 1 includes a downsampled unit and a feature extraction unit. The downsampled unit may be configured to perform downsampled processing on the source image by the pre-processing module 1 to obtain first image data. The feature extraction unit may be configured to perform feature extraction processing on the first image data to obtain the feature data set. The feature data set may include at least one feature data set.

Downsampled may be referred to as subsampled. Assume that the source image may include N*M pixels, a downsampled coefficient may be k. That is, a pixel may be taken every k pixels in each row and column of the source image to form shrunk image data, which is the first image data. N, M, and k may be natural numbers greater than or equal to 1. In some other embodiments, the downsampled unit may be unnecessary or may also be replaced by an upsampling unit or an image interpolation (interpolating) unit. The downsampled may be implemented more simply compared to the upsampling or image interpolation.

The feature extraction unit may be configured to perform the feature extraction on the first image data. The data analysis module 22 may include but is not limited to, at least one of image element information, layout information, boundary contour information, tone information, or color gamut information.

The image element information may include character information, picture information, and/or line information. The character information may include at least one first character in the first image data. The character information may also include position information of each first character (i.e., coordinate value) and size ratio information between the first character and the source image. When a plurality of first characters are included, the character information may further include relationship (i.e., context relationship) information between the plurality of first characters. The picture information may include at least one first picture in the first image. The picture information may further include position information (i.e., coordinate value) of each first picture and size ratio information between the first picture and the source image. The line information may include at least one first line in the first image. The line information may further include position information (i.e., coordinate value) of each first line and size ratio information between the first line and the source image.

During performing an image job, the image processing device 100 may obtain the source image corresponding to the source file that is to be processed. Then, the downsampled unit may be configured to perform downsampling processing on the source image. Then, the feature extraction unit may be configured to extract the image feature. Then, the extracted feature data set may be input to the image processing parameter determination module 2.

The image processing parameter determination module 2 may be configured to determine the image processing parameter corresponding to the feature data set according to the feature data set. In some embodiments, the image processing parameter determination module 2 includes the deep learning module 21 and the data analysis module 22. The deep learning module 21 may be configured to identify the feature data set by using a trained neural network to obtain the identification information.

In embodiments of the present disclosure, the deep learning module 21 may be configured with the pre-trained neural network. The pre-trained neural network may be configured to perform identification and calculation on the input feature data set and output the corresponding calculation result (i.e., identification information). The identification information may include at least one of the file type information, the sensitive character identification information, the CMYK tone adjustment value, the tone curve adjustment value, or the color enhancement adjustment value.

In some embodiments, the deep learning module 21 may be implemented in hardware. Compared with an implementation in pure software, the deep learning module 21 may have a faster calculation speed, which can improve image processing speed to improve the user experience.

In some embodiments, the deep learning module 21 may update and store the feature data set output by the pre-processing module 1 and the identification information corresponding to the feature data set output by the data analysis module 22 in the database of the data analysis module 22. An update and storage process may include determining whether the feature data set output by the pre-processing module 1 has been stored in the database by the deep learning module 21, and if the feature data set is not stored in the database, using the feature data set as sample data and storing in the database by the deep learning module 21.

The database may be used to store sample data for training the neural network in the deep learning module 21. The sample data may be input by the user, or the feature data set output by the pre-processing module 1 may be stored as the sample data. The deep learning module 21 may extract the sample data from the database regularly or according to user needs to train the neural network to adjust the calculation parameter of the neural network automatically. Thus, processing accuracy of the deep learning module 21 of the feature data set output by the pre-processing module 1 may be improved.

The data analysis module 22 may be configured to determine the image processing parameter corresponding to the identification information according to the identification information. The data analysis module 22 may store a correspondence between the identification information and the image processing parameter.

The correspondence between the identification information and the image processing parameter may be stored in the database. When the data analysis module 22 receives the identification information, the data analysis module 22 will analyze and match the data in the database. Since the database stores the correspondence between the identification information and the image processing parameter, the data analysis module 22 may match the image processing parameter corresponding to the identification information as soon after the data analysis module 22 obtains the identification information. The data analysis module 22 may be further configured to adjust the image processing parameter according to user needs and/or user features. For example, The data analysis module 22 may be configured to adjust the image processing parameter according to instruction information input by the user. For another example, user feature data may be obtained through speech recognition technology or face recognition technology. The user feature data may include user age feature data and gender feature data. Then, the data analysis module 22 may be further configured to adjust the image processing parameter according to the user feature data. The present disclosure does not limit how to adjust the image processing parameter in combination with the user features.

Further, since the storage space capacity of the database is limited, in order to ensure that the data in the database will not overflow, the data analysis module 22 will update the sample data stored in the database according to a predetermined update rule, so as to ensure that a data amount of the current database will not overflow. At the same time, the database may include better sample data.

In some embodiments, the data analysis module 22 may be configured to rank each set of sample data in the database, retain the sample data ranked L and less than L, and delete the sample data ranked higher than L. L may be a natural number greater than or equal to 1. In some embodiments, the ranking of each set of sample data in the database by the data analysis module 22 may be determined based on any one or more of the following.

1. A recognition rate of the sample data. The recognition rate of the sample data may be a correct recognition rate of the sample data by the deep learning module 21. When the recognition rate of the sample data by the deep learning module 21 is higher, the ranking is higher.

2. A user habit matching degree of the sample data. The user habit matching degree may be used to represent a matching degree between user habit data and the sample data. The user habit data may include preferred information input by the user through an operation panel or collected parameter information configured when the user uses the image processing device 100. The higher the user habit matching degree of the sample data is, the ranking is higher.

3. A user feature matching degree of the sample data. The user habit matching degree is used to represent a matching degree between user feature data and the sample data. The user feature data may be obtained through the speech recognition technology or the face recognition technology. The user feature data may include such as user age feature data and sex feature data. The higher the user feature matching degree is, the higher the ranking is.

In some other embodiments, the data analysis module 22 may be further configured to update the sample data stored in the database according to other update rules, which is not limited by the present disclosure.

The processing module 3 may be configured to process the source image according to the image processing parameter.

With reference to FIG. 1 again, the processing module 3 includes a first processing unit 31 and a second processing unit 32. The first processing unit 31 may be generally configured to perform image processing steps necessary for the image processing device 100, e.g., base conversion, boundary processing, etc. The second processing unit 32 may be usually configured to perform image processing steps to achieve a better image processing effect or for a special defect, e.g., sharpening enhancement processing, sensitive character removal processing, CMYK tone adjustment processing, tone curve adjustment processing, color adjustment processing, etc. In embodiments of the present disclosure, to facilitate the description, the image processing steps performed by the first processing unit 31 may be referred to as first image processing, and the image processing steps performed by the second processing unit 32 may be referred to as second image processing.

In embodiments of the present disclosure, after obtaining the source image corresponding to the source file that is to be processed, the image processing device 100 may input the source image to the pre-processing module 1 and the first processing unit 31 simultaneously. The pre-processing module 1 and the first processing unit 31 may perform corresponding processing on the source image simultaneously. After performing the first image processing on the source image, the first processing unit 31 may send the processed source image to the second processing unit 32. Thus, the second processing unit 32 may perform the second image processing on the source image processed by the first processing unit 31 according to the image processing parameter. By using the first processing unit 31 and the pre-processing module 1 to perform processing simultaneously, a processing speed for the source image may be improved.

In some other embodiments, the second processing unit 32 may first perform the second image processing. Then, the first processing unit 31 may perform the first image processing on the source image after the second image processing, which is not limited by the present disclosure.

In some embodiments, the first processing unit 31 and the second processing unit 32 may be integrated in a same physical unit or may be separate physical units. The image processing steps performed by the first processing unit 31 and the image processing steps performed by the second processing unit 32 may be adjusted according to actual needs, which are not limited in the present disclosure.

Several image processing solutions in different application scenarios are listed below to further illustrate the image processing device 100 of embodiments of the present disclosure. The image processing solutions listed below may be performed in a superimposed manner or may be performed independently.

The core technical content of solution 1 may include that the deep learning module 21 may be configured to determine a file type of the source file corresponding to the source image according to the feature data set, and then the data analysis module 22 may be configured to match the image processing parameter corresponding to the file type from the database according to the file type. Thus, the image processing parameter may be automatically set.

Figure 2:
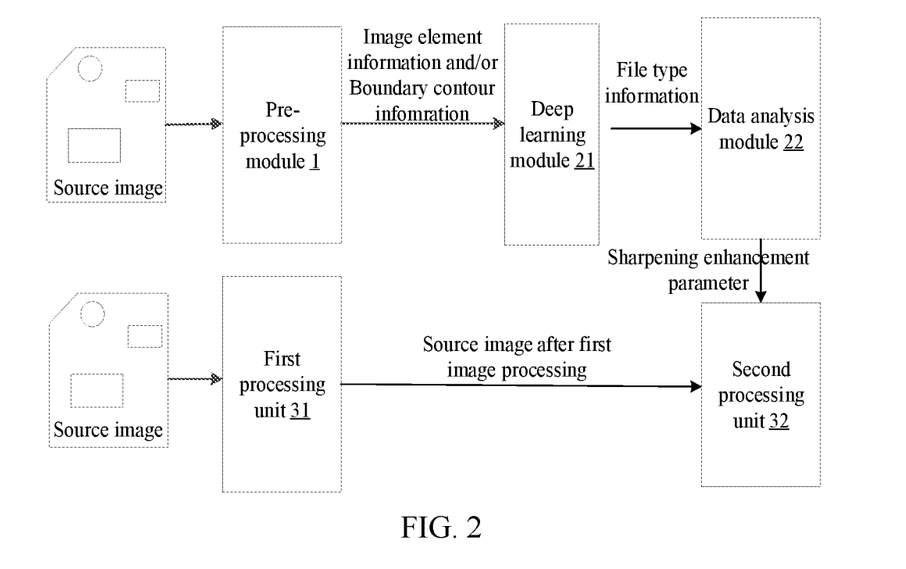
FIG. 2 is a schematic structural diagram of an image processing device in an application scenario according to some embodiments of the present disclosure.

In some embodiments, as shown in FIG. 2, the pre-processing module 1 is configured to perform the feature extraction process on the source image after performing downsampling on the source image to obtain the feature data set. The feature data set may include but is not limited to information such as image element information and/or boundary contour information. The pre-processing module 1 sends the extracted image element information and/or boundary contour information to the deep learning module 21. The image element information may include character information, picture information, and line information. The character information may include at least one first character in the first image. The character information may further include the position information (e.g., coordinate value) of each first character and the size ratio information between the first character and the source image. When a plurality of first characters are included, the character information may further include relationship (e.g., contextual relationship) information between the plurality of first characters. The picture information may include at least one first picture in the first image. Of course, the picture information may also include the position information (e.g., coordinate value) of each first picture and the size ratio information between the first picture and the source image. The line information may include at least one first line in the first image. The line information may further include the position information (e.g., coordinate value) of each first line, and the size ratio information between the first line and the source image.

While the pre-processing module 1 performs downsampling processing on the source image, the first processing unit 31 of the processing module 3 may perform the first image processing on the source image and send the source image after the first image processing to the second processing unit 32. The first processing unit 31 may be usually configured to perform the image processing steps necessary for the image processing device 100, such as the base conversion, the boundary processing, etc. The present disclosure does not limit the processing steps of the first processing unit 31.

The deep learning module 21 may be configured to identify the file type of the source file corresponding to the source image according to the image element information and/or boundary contour information to generate the identification information. In the solution, the identification information may include file type information. The file type may include, for example, a text type, a text image type, a picture type, etc. The text type may mean that the source file corresponding to the source image may be a plain text type. The text image type may mean that the source file corresponding to the source image includes both text and pictures. The picture type may mean that the source file corresponding to the source image may include only pictures and no text. In some other embodiments, the file type may further include other types, e.g., a ticket type, a certificate type, and a business card type.

The data analysis module 22 may be configured to match the image processing parameter in the database according to the file type information and output the image processing parameter corresponding to the file type information to the second processing unit 32 of the processing module 3. The second processing unit 32 may be configured to process the source image processed by the first processing unit 31 according to the first image processing parameter. Thus, the file that needs to be printed, copied, or scanned may achieve a good image output effect automatically. In embodiments of the present disclosure, the image processing parameter may include a sharpening and enhancement parameter. In some other embodiments, the image processing parameter may further include copying/scanning/printing feature curve parameters.

In the solution, different image processing parameters may be used for different types of source files. Thus, the image processing device 100 may automatically generate the image processing parameters for different types of source files, and automatically set the image processing parameters without manual setting by an operator. Therefore, the image processing may be performed intelligently, the user experience may be improved, the user cumbersome operations may be simplified, and file copy and output quality may be improved.

A core technical content of the second solution may include that the deep learning module 21 may be configured to determine image quality adjustment values of the source file corresponding to the source image according to the feature data set. Then, the data analysis module 22 may be configured to match the image processing parameters corresponding to the image quality adjustment values from the database according to the image quality adjustment values. Thus, the image processing parameters may be set automatically, and the problem of the cumbersome setting of the image processing parameters may be solved.

Figure 3:
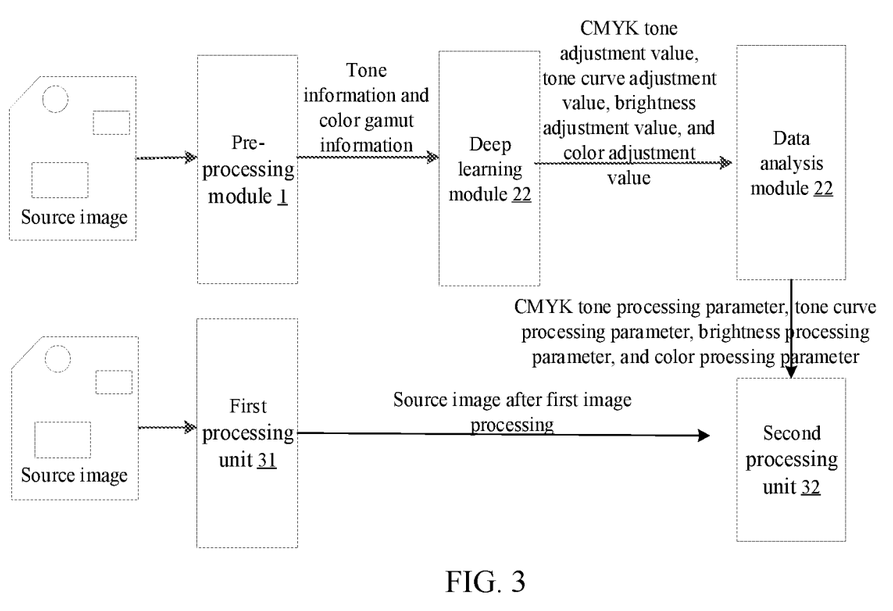
FIG. 3 is a schematic structural diagram of an image processing device in another application scenario according to some embodiments of the present disclosure.

In some embodiments, as shown in FIG. 3, after performing the downsampling processing on the source image, the pre-processing module 1 performs the feature extraction processing to obtain the feature data set. The feature data set may include but is not limited to at least one of tone information and color gamut information. The pre-processing module 1 sends the extracted information such as the tone information and the color gamut information to the deep learning module 21. While the pre-processing module 1 performs down-sampling processing on the source image, the first processing unit 31 of the processing module 3 starts to perform the first image processing on the source image and sends the source image after the first image processing to the second processing unit 32. The first processing unit 31 may be generally configured to perform the image processing steps necessary for the image processing device 100, such as base conversion, boundary processing, etc.

The deep learning module 21 may be configured to identify the tone information and color gamut information by using the trained neural network and output the identification information. In the solution, the identification information may include, but is not limited to, at least one of a CMYK tone adjustment value, a tone curve adjustment value, a brightness adjustment value, or a color adjustment value.

The data analysis module 22 may be configured to match the image processing parameter in the database according to the identification information and output the second image processing parameter corresponding to the identification information to the second processing unit 32 of the processing module 3. In some embodiments, the second image processing parameter may include at least one of a CMYK tone processing parameter, a tone curve processing parameter, a brightness processing parameter, or a color processing parameter. The color processing parameter may include a color saturation parameter, a chromaticity parameter, or a color balance parameter. The CMYK tone adjustment parameter may correspond to the CMYK tone processing value. The tone curve adjustment parameter may correspond to the tone curve processing value. The brightness processing parameter may correspond to the brightness adjustment value. The color processing parameter may correspond to the color adjustment value.

The second processing unit 32 may be configured to process the source image processed by the first processing unit 31 according to the first image processing parameter. Thus, the file that is to be printed, copied, or scanned may automatically achieve a good image output effect.

In the solution, the deep learning module 21 may be configured to identify and calculate the tone information and the color gamut information by using the trained neural network according to the tone information and the color gamut information of the source image corresponding to the source file and output the CMYK tone adjustment value, the tone curve adjustment value, the brightness adjustment value, and the color adjustment value corresponding to the source image. Then, the data analysis module 22 may be configured to convert the identification information into the corresponding image processing parameter, so that the image processing device 100 can automatically adjust the image processing parameter according to the tone information and color gamut information of the source file. Thus, the image processing device 100 may automatically set the image processing parameter without manual setting by the operator. By extracting the tone information and color gamut information of the source file and considering user habits, the color processing may be performed in a customized manner. Thus, the color restoration quality may be ensured, and the image processing may be performed intelligently, which improves the user experience.

A third solution may be mainly suitable for processing a source file that contains a sensitive character (e.g., a bill, a contract, and a financial document, etc.). The core technical content of the third solution may include that the deep learning module 21 may be configured to determine sensitive character identification information of the source file corresponding to the source image according to the feature data set. Then, the data analysis module 22 may be configured to generate a sensitive character processing parameter corresponding to the sensitive character identification information according to the sensitive character identification information. Thus, the hidden processing of the sensitive character in the source file may be realized, which may avoid leakage of important or private information and improve security of file information.

Figure 4:
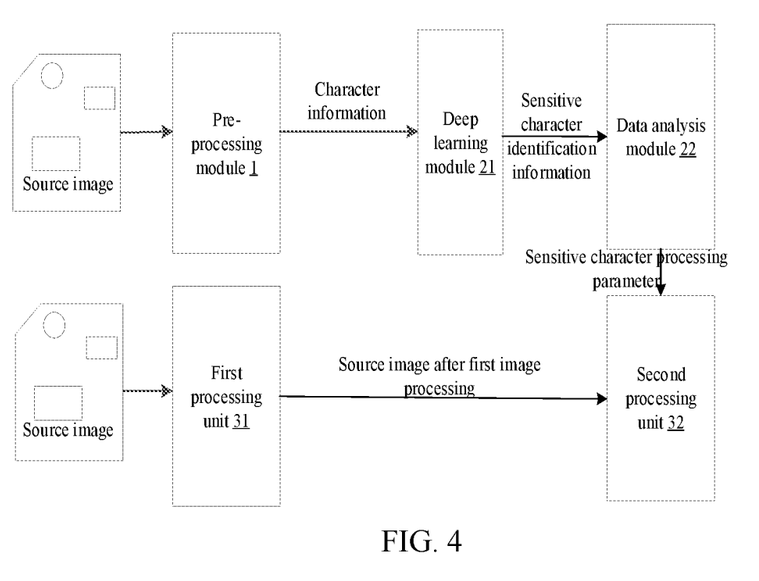
FIG. 4 is a schematic structural diagram of an image processing device in still another application scenario according to some embodiments of the present disclosure.

As shown in FIG. 4, in the solution, the pre-processing module 1 further includes a character segmentation unit (not shown in the drawing). The feature data set may include character information. In some embodiments, the pre-processing module 1 may be configured to obtain the first image after downsampling the source image corresponding to the source file. Then, the pre-processing module 1 may be configured to identify a character image area in the first image through the feature extraction unit and segment the character image area into a single character image to obtain the character information. The character information may include at least one first character and the position information (such as coordinate value) of each first character in the at least one first character. When the plurality of first characters are included, the character information may further include relationship (e.g., context relationship) information among the first characters.

In embodiments of the present disclosure, the feature extraction unit may adopt optical character recognition (OCR) technology to identify the character image area in the first image. The OCR technology may convert character content on a picture and a photo into editable text.

While the pre-processing module 1 performs the downsampling processing on the source image, the first processing unit 31 of the processing module 3 may perform the first image processing on the source image and send the source image after the first image processing to the second processing unit 32. The first processing unit 31 may be generally configured to perform the image processing steps necessary for the image processing device 100, e.g., base conversion, boundary processing, etc.

After obtaining the character information generated by the pre-processing module 1, the deep learning module 21 may be configured to identify each first character in at least one character by using the trained neural network to identify whether each first character in the at least one first character is a sensitive character, and output the sensitive character identification information to the data analysis module 22. The sensitive character identification information may include at least one sensitive character in the at least one first character and the position information (e.g., coordinate value) corresponding to each sensitive character. The sensitive character may usually include a character is used to represent bills or personal information that needs to be hidden.

The data analysis module 22 may be configured to obtain the at least one sensitive character in the at least one first character output by the deep learning module 21 and the position information corresponding to each sensitive character. Then, the data analysis module 22 may be configured to perform first mark processing on the sensitive character in the at least one first character. For example, the data analysis module 22 may be configured to mark the sensitive character in the at least one first character as "hidden." The data analysis module 22 may be configured to perform second mark processing on an insensitive character in the at least one first character. For example, the data analysis module 22 may be configured to mark the insensitive character in the at least one first character as "public." Thus, the data analysis module 22 may be configured to generate the sensitive character processing parameter. In some embodiments, the sensitive character processing parameter may include mark information and position information (e.g., coordinate value) of each first character in the at least one first character. In some other embodiments, the sensitive character processing parameter may also include only the mark information of the sensitive character and the position information (e.g., coordinate value) of the sensitive character.

The second processing unit 32 may be configured to obtain the source image processed by the first processing unit 31 and the sensitive character processing parameter. The second processing unit 32 may be configured to perform sensitive character removal processing on the source image after the first image processing according to the sensitive character processing parameter. For example, the sensitive character removal processing may be a binarization processing on the image area where the sensitive character is located. For example, the image area where the sensitive character is located may be set to be completely black or completely white to realize the hidden processing of the sensitive character and enhance the security of the confidential level file.

Figure 5:
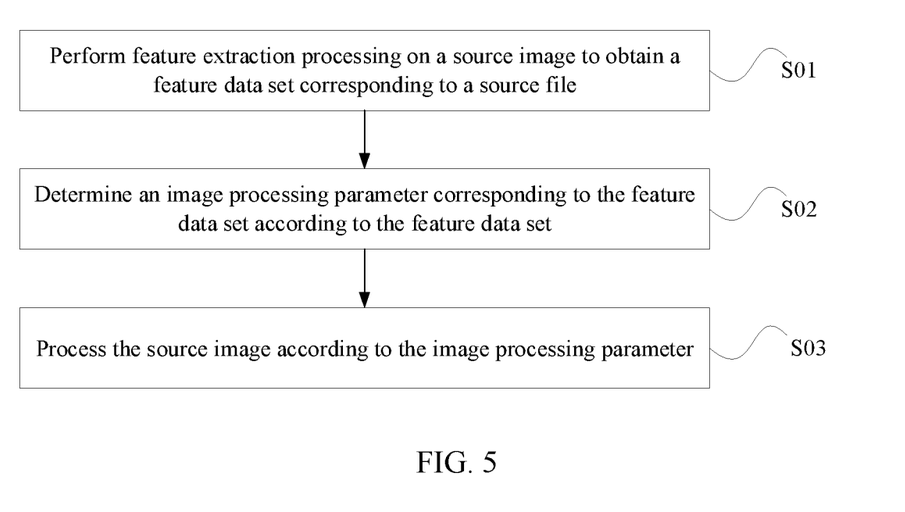
FIG. 5 is a schematic flowchart of an image processing method according to some embodiments of the present disclosure.

As shown in FIG. 5, embodiments of the present disclosure provide an image processing method. The image processing method may be applied to the image processing device 100 of embodiments of the present disclosure. The image processing method includes performing feature extraction processing on a source image to obtain a feature data set corresponding to a source file (S01), determining an image processing parameter corresponding to the feature data set according to the feature data set (S02), and processing the source image according to the image processing parameter (S03).

In some embodiments, by performing the feature extraction processing on the source image, the trained neural network may be configured to identify the feature data set and eventually generate the image processing parameter corresponding to the source image. Therefore, the image processing parameter of the source image may not need to be manually adjusted, and the image processing may be performed intelligently.

In some embodiments, determining the image processing parameter corresponding to the feature data set according to the feature data set may include identifying the feature data set by using a trained neural network to obtain identification information and determining the image processing parameter corresponding to the identification information.

In some embodiments, performing the feature extraction processing on the source image may further include performing first image processing on the source image. Processing the source image according to the image processing parameter may include performing second image processing on the source image after the first image processing according to the image processing parameter.

In some embodiments, performing the feature extraction on the source file to obtain the feature data set corresponding to the source file may include performing downsampling processing on the source image to obtain first image data and performing the feature extraction processing on the first image data to obtain the feature data set.

In some embodiments, the feature data set may include image element information and/or boundary contour information of the first image data. The identification information may include file type information. Identifying the feature data set by using the trained neural network to obtain the identification information may include performing file type identification on the source file corresponding to the source image by using the trained neural network according to the image element information and/or boundary contour information to obtain the file type information of the source file.

In some embodiments, the image processing parameter may include a sharpening processing parameter. Determining the image processing parameter corresponding to the identification information may include retrieving the sharpening processing parameter corresponding to the file type of the source file from the database according to the file type information. Processing the source image according to the image processing parameter may include performing sharpening processing on the source image after the first image processing according to the sharpening processing parameter.

In some embodiments, the feature data set may include character information. The character information may include at least one first character and position information of each first character. The identification information may include sensitive character identification information. The sensitive character identification information may include at least one sensitive character of the at least one first character and the position information corresponding to each sensitive character.

Identifying the feature data set by using the trained neural network to obtain the identification information may include identifying the sensitive character in the at least one first character by using the trained neural network to obtain at least one sensitive character in the at least one first character and the position information corresponding to each sensitive character.

In some embodiments, the image processing parameter may include the sensitive character processing parameter.

Determining the image processing parameter corresponding to the identification information may include generating the sensitive character processing parameter according to the at least one sensitive character of the at least one first character and the position information corresponding to each sensitive character.

Processing the source image according to the image processing parameter may include performing sensitive character removal processing on the source image after the first image processing according to the sensitive character processing parameter.

In some embodiments, the feature data set may include tone information and color gamut information. The identification information may include a CMYK tone adjustment value, a tone curve adjustment value, a brightness adjustment value, and a color adjustment value.

Performing identification on the feature data set by using the trained neural network to obtain the identification information may include identifying the tone information and the color gamut information by using the trained neural network to obtain the CMYK tone adjustment value, the tone curve adjustment value, the brightness adjustment value, and the color adjustment value.

In some embodiments, the image processing parameter may include a CMYK tone processing parameter, a tone curve processing parameter, a brightness processing parameter, and a color processing parameter.

Determining the image processing parameter corresponding to the identification information may include retrieving the CMYK tone processing parameter corresponding to the CMYK tone adjustment value, the tone curve processing parameter corresponding to the tone curve adjustment value, the brightness processing parameter corresponding to the brightness adjustment value, and the color processing parameter corresponding to the color adjustment value from the database according to the CMYK tone adjustment value, the tone curve adjustment value, the brightness adjustment value, and the color adjustment value.

Processing the source image according to the image processing parameter may include processing the source image according to the CMYK tone processing parameter, the tone curve processing parameter, the brightness processing parameter, and the color processing parameter.

For more specific content of the image processing method, references may be made to the corresponding content of the image processing device above, which is not repeated here.

Embodiments of the present disclosure provide a storage medium, e.g., a non-transitory computer readable storage medium. The storage medium may include stored program instructions. When the program instructions are executed, the apparatus where the storage medium is located may be controlled to execute the data processing method executed by the consumable chip. For the method executed by the consumable chip, references may be made to the description above, which is not repeated here.

Figure 6:
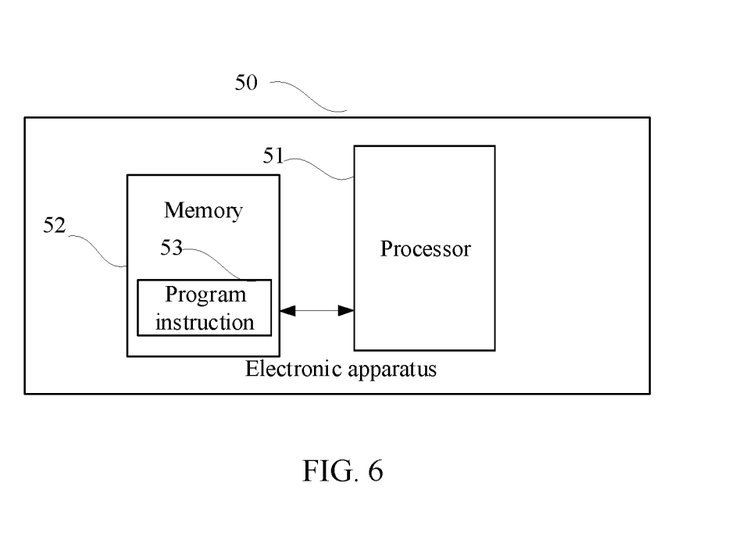
FIG. 6 is a schematic structural diagram of an electronic apparatus according to some embodiments of the present disclosure.

As shown in FIG. 6, embodiments of the present disclosure provide an electronic apparatus 50. The electronic apparatus 50 includes a processor 51, a memory 52, and a computer program instruction 53 that is stored in the memory 52 and executed by the processor 51. When the computer program instruction 53 is executed by the processor 51, the processor 51 may be caused to implement the image processing method of embodiments of the present disclosure. In some embodiments, when the computer program instruction 53 is executed by the processor 51, functions of modules/units of the image processing device 100 shown in FIG. 1 may be implemented, which is not repeated here.

The above are only some embodiments of the present disclosure, and are not intended to limit the present disclosure. Any modifications, equivalent replacements, improvements, etc. made within the spirit and principle of the present disclosure should be within the scope of the present disclosure.

What is claimed is:

1. An image processing method, applied to an electronic apparatus, comprising:
    performing feature extraction processing on a source image to obtain a feature data set corresponding to a source file;
    determining an image processing parameter corresponding to the feature data set according to the feature data set, including performing identification on the feature data set by using a trained neural network to obtain identification information and determining the image processing parameter corresponding to the identification information; and
    processing the source image according to the image processing parameter,
    wherein:
        the feature data set includes tone information;
        the identification information includes a CMYK tone adjustment value, and a tone curve adjustment value;
        the image processing parameter includes a CMYK tone processing parameter, and a tone curve processing parameter;
        performing identification on the feature data set by using the trained neural network to obtain the identification information includes:
            identifying the tone information by using the trained neural network to obtain the CMYK tone adjustment value, and the tone curve adjustment value; and
        determining the image processing parameter corresponding to the identification information includes:
            retrieving the CMYK tone processing parameter corresponding to the CMYK tone adjustment value, and the tone curve processing parameter corresponding to the tone curve adjustment value.

2. The method according to claim 1, wherein the pre-trained neural network is configured to perform identification and calculation on the feature data set to output the identification information.

3. The method according to claim 2, wherein:
    the feature data set includes image element information and/or boundary contour information in first image data;
    the identification information includes file type information;
    performing the identification on the feature data set by using the trained neural network to obtain the identification information includes:
        performing file type identification on the source file corresponding to the source image by using the trained neural network according to the image element information and/or the boundary contour information to obtain the file type information of the source file.

4. The method according to claim 1, wherein performing the feature extraction processing on the source image further includes:
    performing first image processing on the source image; and
    processing the source image according to the image processing parameter, including performing second image processing on the source image after the first image processing according to the image processing parameter.

5. The method according to claim 4, wherein:
    the feature data set includes character information;
    the character information includes at least one first character and position information of each first character;
    the identification information includes sensitive character identification information;
    the sensitive character identification information includes at least one sensitive character of the at least one first character and position information corresponding to each sensitive character;
    the image processing parameter includes a sensitive character processing parameter;
    performing the identification on the feature data set by using the trained neural network to obtain the identification information includes:
        performing sensitive character identification on the at least one first character by using the trained neural network to obtain the at least one sensitive character and the position information corresponding to each sensitive character of the at least one first character;
    determining the image processing parameter corresponding to the identification information includes:
        generating the sensitive character processing parameter according to the at least one sensitive character of the at least one first character and the position information corresponding to each sensitive character; and
    processing the source image according to the image processing parameter includes:
        performing sensitive character removal processing on the source image after the first image processing according to the sensitive character processing parameter.

6. The method according to claim 4, wherein:
the feature data set includes color gamut information;
the identification information includes a brightness adjustment value, and a color adjustment value;
the image processing parameter includes a brightness processing parameter, and a color processing parameter;
performing identification on the feature data set by using the trained neural network to obtain the identification information includes:
  identifying the color gamut information by using the trained neural network to obtain the brightness adjustment value, and the color adjustment value;
determining the image processing parameter corresponding to the identification information includes:
  retrieving the brightness processing parameter corresponding to the brightness adjustment value, and the color processing parameter corresponding to the color adjustment value from a database according to the brightness adjustment value, and the color adjustment value; and
processing the source image according to the image processing parameter includes:
  according to the CMYK tone processing parameter, the tone curve processing parameter, the brightness processing parameter, and the color processing parameter, processing the source image after the first image processing.

7. An electronic apparatus comprising:
a memory storing program instructions; and
a processor coupled with the memory and, when the program instructions being executed, configured to:
  perform feature extraction processing on a source image to obtain a feature data set corresponding to a source file;
  determine an image processing parameter corresponding to the feature data set according to the feature data set; and
  process the source image according to the image processing parameter,
  wherein,
    the processor is further configured to:
      perform identification on the feature data set by using a trained neural network to obtain identification information; and
      determine the image processing parameter corresponding to the identification information according to the identification information;
    the feature data set includes tone information;
    the identification information includes a CMYK tone adjustment value, and a tone curve adjustment value;
    the image processing parameter includes a CMYK tone processing parameter, and a tone curve processing parameter; and
    the processor is further configured to:
      identify the tone information by using the trained neural network to obtain the CMYK tone adjustment value, the tone curve adjustment value; and
      retrieve the CMYK tone processing parameter corresponding to the CMYK tone adjustment value, the tone curve processing parameter corresponding to the tone curve adjustment value, from a database according to the CMYK tone adjustment value, the tone curve adjustment value.

8. The electronic apparatus according to claim 7, wherein
the pre-trained neural network is configured to perform identification and calculation on the feature data set to output the identification information.

9. The electronic apparatus according to claim 8, wherein:
the feature data set includes image element information and/or boundary contour information in first image data;
the identification information includes file type information;
the processor is further configured to:
  perform file type identification on the source file corresponding to the source image by using the trained neural network according to the image element information and/or the boundary contour information to obtain the file type information of the source file.

10. The electronic apparatus according to claim 7, wherein the processor is further configured to:
perform first image processing on the source image; and
process the source image according to the image processing parameter, including performing second image processing on the source image after the first image processing according to the image processing parameter.

11. The electronic apparatus according to claim 10, wherein:
the feature data set includes character information;
the character information includes at least one first character and position information of each first character;
the identification information includes sensitive character identification information;
the sensitive character identification information includes at least one sensitive character of the at least one first character and position information corresponding to each sensitive character;
the image processing parameter includes a sensitive character processing parameter;
the processor is further configured to:
  perform sensitive character identification on the at least one first character by using the trained neural network to obtain the at least one sensitive character and the position information corresponding to each sensitive character of the at least one first character;
  generate the sensitive character processing parameter according to the at least one sensitive character of the at least one first character and the position information corresponding to each sensitive character; and
  perform sensitive character removal processing on the source image after the first image processing according to the sensitive character processing parameter.

12. The electronic apparatus according to claim 10, wherein:
the feature data set includes color gamut information;
the identification information includes a brightness adjustment value, and a color adjustment value;
the image processing parameter includes a brightness processing parameter, and a color processing parameter;
the processor is further configured to:
  identify the color gamut information by using the trained neural network to obtain the brightness adjustment value, and the color adjustment value;
  retrieve the brightness processing parameter corresponding to the brightness adjustment value, and the color processing parameter corresponding to the color adjustment value from a database according the brightness adjustment value, and the color adjustment value; and according to the CMYK tone processing parameter, the tone curve processing parameter, the brightness processing parameter, and the color processing parameter, process the source image after the first image processing.

13. A non-transitory computer-readable storage medium storing a program that, when executed by a processor, causes the processor to:

perform feature extraction processing on a source image to obtain a feature data set corresponding to a source file;

determine an image processing parameter corresponding to the feature data set according to the feature data set; and process the source image according to the image processing parameter, wherein, the processor is further configured to:

perform identification on the feature data set by using a trained neural network to obtain identification information; and determine the image processing parameter corresponding to the identification information according to the identification information;

the feature data set includes tone information;

the identification information includes a CMYK tone adjustment value, and a tone curve adjustment value;

the image processing parameter includes a CMYK tone processing parameter, and a tone curve processing parameter; and the processor is further configured to:

identify the tone information by using the trained neural network to obtain the CMYK tone adjustment value, the tone curve adjustment value; and retrieve the CMYK tone processing parameter corresponding to the CMYK tone adjustment value, the tone curve processing parameter corresponding to the tone curve adjustment value, from a database according to the CMYK tone adjustment value, the tone curve adjustment value.

14. The storage medium according to claim 13, wherein the pre-trained neural network is configured to perform identification and calculation on the feature data set to output the identification information.

15. The storage medium according to claim 14, wherein:

the feature data set includes image element information and/or boundary contour information in first image data;

the identification information includes file type information;

the processor is further configured to:

perform file type identification on the source file corresponding to the source image by using the trained neural network according to the image element information and/or the boundary contour information to obtain the file type information of the source file.

16. The storage medium according to claim 13, wherein the processor is further configured to:

perform first image processing on the source image; and process the source image according to the image processing parameter, including performing second image processing on the source image after the first image processing according to the image processing parameter.

17. The storage medium according to claim 16, wherein:

the feature data set includes character information;

the character information includes at least one first character and position information of each first character;

the identification information includes sensitive character identification information;

the sensitive character identification information includes at least one sensitive character of the at least one first character and position information corresponding to each sensitive character;

the image processing parameter includes a sensitive character processing parameter;

the processor is further configured to:

perform sensitive character identification on the at least one first character by using the trained neural network to obtain the at least one sensitive character and the position information corresponding to each sensitive character of the at least one first character;

generate the sensitive character processing parameter according to the at least one sensitive character of the at least one first character and the position information corresponding to each sensitive character; and perform sensitive character removal processing on the source image after the first image processing according to the sensitive character processing parameter.

18. The storage medium according to claim 16, wherein:

the feature data set includes color gamut information;

the identification information includes a brightness adjustment value, and a color adjustment value;

the image processing parameter includes a brightness processing parameter, and a color processing parameter;

the processor is further configured to:

identify the color gamut information by using the trained neural network to obtain the brightness adjustment value, and the color adjustment value;

retrieve the brightness processing parameter corresponding to the brightness adjustment value, and the color processing parameter corresponding to the color adjustment value from a database according to the brightness adjustment value, and the color adjustment value; and according to the CMYK tone processing parameter, the tone curve processing parameter, the brightness processing parameter, and the color processing parameter, process the source image after the first image processing.

* * * * *